United States Patent Office 2,909,530
Patented Oct. 20, 1959

2,909,530

PHYSOSTIGMINE DERIVATIVES

Bernard Rudner, Pittsburgh, Pa., assignor to W. R. Grace & Co., New York, N.Y., a corporation of Connecticut No Drawing. Application September 26, 1958
Serial No. 763,429

3 Claims. (Cl. 260—319)

This invention relates to quaternary nitrogenous salts. In one specific aspect, it relates to quaternized derivatives of substituted indoles related to physostigmine.

Physostigmine, also called eserine, and certain of its derivatives are well known compounds useful in the treatment of glaucoma and other conditions. I have discovered a heretofore unavailable class of pharmaceutically useful eserine derivatives.

It is therefore an object of the present invention to provide a new generic class of hypotensive hydrazinium compounds.

The compounds of my invention are conveniently prepared by the action of chloramine on the appropriate tertiary amine. It is believed that addition takes place at the less hindered nitrogen as indicated below. In the preferred practice of this invention, the reactant tertiary amine dissolved in an unreactive solvent is exposed to a stream of gaseous chloramine. The resultant hydrazinium chloride is isolated by conventional laboratory techniques. Compounds containing anions other than chloride are prepared by metathesis starting with the chloride and a compound containing the anion to be introduced.

In accordance with the present invention, I have made available a new class of hydrazinium compounds having the general formula:

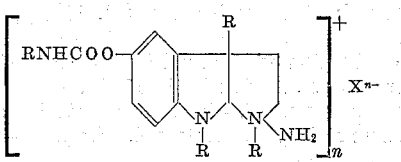

In the above formula, R is a lower alkyl group and X is an anion bearing the charge $n$.

When my compounds are used for pharmaceutical purposes, X must be a pharmaceutically acceptable anion. The primary attributes of such an anion are nontoxicity and pharmaceutical compatibility. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, dephenylhydantoin, carbonate, cacodylate, aconitate, sulfamate, gentisate, malate and the like.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., U. S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. I, 59 (1939). Alternatively, the chloramine can be formed in the presence of the amine as described in the copending application Serial No. 605,230 filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the condition of the reaction. Solvents which serve this purpose include hydrocarbons, e.g., heptane, cyclohexane, benzene, xylene and the like; ethers e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and Cellosolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines. This latter method produced the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

The scope and utility of my invention is further illustrated by the following examples:

*Example I*

Twenty-five grams of eserine sulfate was converted to the free base by treatment with aqueous sodium bicarbonate and the eserine extracted with chloroform. The dried extract was reacted with excess chloramine, filtered from the ammonium chloride formed and evaporated to dryness. The residue was a hygroscopic light brown gum. Trituration of the gum with ether gave a brown powder which reverted to the gum on standing in air. A portion of the powder was recrystallized from ethyl alcohol-ethyl acetate to give a hygroscopic product melting 190–192° C. which darkened on exposure to air.

*Example II*

Four grams of eserine sulfate was treated with aqueous sodium bicarbonate and two grams of the free base extracted with chloroform. The 400 ml. chloroform extract was dried, treated with excess chloramine, filtered and evaporated to dryness. The two gram residue was dissolved in a small amount of methyl alcohol and the solution filtered into an excess of ethyl acetate. Filtration gave about a gram of a light tan material melting 190–193° C.

*Example III*

The product of Example II was dissolved in physiological saline at concentrations of 1.0 and 10 mg./ml. A male dog weighing 11.3 kg. received intravenous doses of 0.05, 0.25, 1.25 and 5.0 mg./kg. over a period of approximately three hours. Doses of 1.25 mg./kg. caused a marked fall in blood pressure lasting approximately 40 minutes; slight but transient respiratory stimulation occurred immediately following this dose.

I claim:
1. Compounds having the general formula:

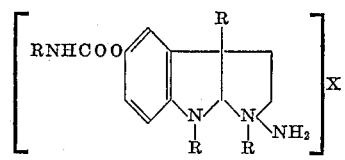

wherein R is a lower alkyl group and X is a pharmaceutically acceptable anion.
2. Compounds according to claim 1 wherein R is methyl.
3. Compounds according to claim 2 wherein X is chloride.

References Cited in the file of this patent

UNITED STATES PATENTS 2,755,287     Schlitter et al. _____ July 17, 1956

OTHER REFERENCES

Hoshino et al.: Liebig's Ann., vol. 520, pp. 11–12 (1935).
Polonovski: Comptes Rendus, vol. 179, pp. 334–336 (1924).
Chem. Abstracts, vol. 47, p. 2372h (1953), citing Laborit Therapie, vol. 3, pp. 59–61 (1948).
Chem. Abstracts, vol. 49, p. 9710a (1955), citing Collier Biochem et Biophy. Acta, vol. 16, pp. 583–8 (1955).